(12) United States Patent
Schroader (10) Patent No.: US 9,038,810 B2
(45) Date of Patent: May 26, 2015

(54) SINGULATOR CONVEYOR

(71) Applicant: Steven Schroader, Louisville, KY (US)

(72) Inventor: Steven Schroader, Louisville, KY (US)

(73) Assignee: FIVES INTRALOGISTICS CORP., Louisville, KY (US)

( * ) Notice: Subject to any disclaimer, the term of this patent is extended or adjusted under 35 U.S.C. 154(b) by 97 days.

(21) Appl. No.: 13/795,112

(22) Filed: Mar. 12, 2013

(65) Prior Publication Data

US 2014/0262686 A1 Sep. 18, 2014

(51) Int. Cl.
*B65G 25/08* (2006.01)
*B65G 47/31* (2006.01)
*B65G 47/68* (2006.01)
*B65G 47/22* (2006.01)

(52) U.S. Cl.
CPC .............. *B65G 47/682* (2013.01); *B65G 47/22* (2013.01)

(58) Field of Classification Search
USPC ......... 198/400, 407, 411, 412, 413, 415, 436, 198/406
See application file for complete search history.

(56) References Cited

U.S. PATENT DOCUMENTS

| | | | |
|---|---|---|---|
| 1,863,520 A | 6/1932 | Camerota | |
| 1,898,005 A | 2/1933 | Diescher | |
| 1,931,454 A | 10/1933 | Anderson | |
| 1,946,453 A | 2/1934 | Brodbeck | |
| 1,946,458 A | 2/1934 | Evans | |
| 2,566,417 A | 9/1951 | Holm | |
| 3,272,298 A | 9/1966 | Cato | |
| 3,973,672 A * | 8/1976 | Frost | 198/412 |
| 4,044,897 A * | 8/1977 | Maxted | 198/349 |
| 4,111,412 A | 9/1978 | Cathers | |
| 4,143,756 A | 3/1979 | Chorlton | |
| 4,264,002 A | 4/1981 | Van Der Schie | |
| 5,101,958 A * | 4/1992 | LeMay et al. | 198/436 |
| 5,222,586 A | 6/1993 | Ydoate et al. | |
| 5,400,896 A | 3/1995 | Loomer | |
| 5,415,281 A | 5/1995 | Taylor et al. | |
| 5,501,315 A | 3/1996 | Loomer | |
| 5,531,311 A | 7/1996 | LeMay et al. | |
| 5,701,989 A | 12/1997 | Boone et al. | |
| 5,738,202 A | 4/1998 | Ydoate et al. | |
| 5,769,204 A | 6/1998 | Okada et al. | |

(Continued)

FOREIGN PATENT DOCUMENTS

DE 102008060105 A1 6/2010
EP 1122195 A1 8/2001

(Continued)

OTHER PUBLICATIONS

"The smartest distance between two points", Package Handling Solutions, Introlox brochure, 2008, 4 pages.

(Continued)

*Primary Examiner* — Douglas Hess
(74) *Attorney, Agent, or Firm* — Harness, Dickey & Pierce, P.L.C.

(57) ABSTRACT

A conveyor machine is provided. In another aspect, a singulator conveyor employs three-dimensionally obliquely skewed driven rollers angularly offset from a primary feeding and downstream direction, outboard of an adjacent driven conveyor having a top surface moving in the primary feeding and downstream direction. A further aspect provides a downstream moving conveyor belt or rollers which are vertically higher than the adjacent outboard skewed and converging driven rollers.

39 Claims, 9 Drawing Sheets

(56) References Cited

U.S. PATENT DOCUMENTS

| | | | |
|---|---|---|---|
| 5,918,723 A | 7/1999 | Schuitema et al. | |
| 5,950,800 A | 9/1999 | Terrell et al. | |
| 6,056,107 A | 5/2000 | Schuitema et al. | |
| 6,131,723 A | 10/2000 | Schroader et al. | |
| 6,148,990 A | 11/2000 | Lapeyre et al. | |
| 6,164,431 A * | 12/2000 | Morisod | 198/415 |
| 6,253,905 B1 | 7/2001 | Pelka | |
| 6,269,933 B1 | 8/2001 | Schuitema et al. | |
| 6,318,544 B1 | 11/2001 | O'Connor et al. | |
| 6,390,277 B2 | 5/2002 | Pelka | |
| 6,401,936 B1 | 6/2002 | Isaacs et al. | |
| 6,491,154 B2 | 12/2002 | Ydoate et al. | |
| 6,494,312 B2 | 12/2002 | Costanzo | |
| 6,622,847 B2 | 9/2003 | Schuitema et al. | |
| 6,659,264 B2 | 12/2003 | Pelka | |
| 6,694,220 B1 | 2/2004 | Tanz | |
| 6,758,323 B2 | 7/2004 | Costanzo | |
| 7,073,651 B2 | 7/2006 | Costanzo et al. | |
| 7,090,067 B2 | 8/2006 | Schiesser et al. | |
| 7,191,894 B2 | 3/2007 | Costanzo et al. | |
| 7,552,815 B2 * | 6/2009 | Pahud | 198/413 |
| 7,900,768 B2 | 3/2011 | Fourney | |
| 7,938,252 B2 | 5/2011 | Schroader | |
| 8,123,021 B2 | 2/2012 | DePaso et al. | |
| 8,689,965 B2 * | 4/2014 | Sjogren et al. | 198/415 |
| 2014/0001010 A1 | 1/2014 | Cristoforetti | |

FOREIGN PATENT DOCUMENTS

| | | |
|---|---|---|
| EP | 1293432 A1 | 3/2003 |
| JP | H0867334 A | 3/1996 |
| JP | 2000247419 A | 9/2000 |
| JP | 2007153484 A | 6/2007 |
| JP | 2007204222 A | 8/2007 |
| SU | 602442 A1 | 4/1978 |
| WO | WO-2009114439 A2 | 9/2009 |

OTHER PUBLICATIONS

Fives Cinetic engineering drawing No. A003225A-01 entitled "Herringbone Conveyor Assembly Converging", (offered for sale or publicly used in U.S. around Jun. 27, 2008), 2 pages.

"Linear Parcel Singulator", Fives Cinetic brochure, 2011, 2 pages.

"Accord Singulator", Fives Cinetic brochure, (published on or before Feb. 21, 2013), 2 pages.

"The Gator Singulator", Herringbone Roller Singulator, Roach Conveyors brochure, (published on or before Feb. 21, 2013), 4 pages.

"Activated Roller Belt Singulators—Fact Sheet", Omni Metalcraft Corp. brochure, (published prior to Mar. 2013), 3 pages.

* cited by examiner

SINGULATOR CONVEYOR

BACKGROUND AND SUMMARY

The disclosure relates generally to conveyors and more particularly to a singulator conveyor.

It is known to employ a singulator conveyor to unscramble randomly oriented articles. Examples of such traditional singulator conveyors can be found in U.S. Pat. No. 5,769,204 entitled "Singulator Conveyor System Having Package-Return Conveyors" which issued to Okada and Ydoate on Jun. 23, 1998, and U.S. Pat. No. 5,400,896 entitled "Unscrambling Conveyor" which issued to Loomer on Mar. 28, 1995. Both of these patents are incorporated by reference herein.

Another traditional singulator conveyor is known as the Accord™ singulator from the present assignee. This singulator employs a central conveyor belt outwardly bordered by sets of driven rollers which are only skewed in a top view direction. These Accord™ singulator rollers are horizontally coplanar with each other and are vertically higher than the central conveyor belt. While this Accord™ singulator is a considerable improvement in the industry, it still allows envelopes and packages to restack upon each other as they move from the rollers to the central conveyor belt.

Furthermore, U.S. Pat. No. 2,566,417 entitled "Conveyor Switch" which issued to Holm on Sep. 4, 1951 discloses a switching mechanism between two conveyor branches. This conveyor switch is entirely unrelated to a singulator conveyor, however, it does employ downwardly and rearwardly angled diverging outboard rollers. Nevertheless, it is noteworthy that this prior device has laterally pivotal idler rollers which are passive.

In accordance with the present invention, a conveyor machine is provided. In another aspect, a singulator conveyor employs three-dimensionally obliquely skewed driven rollers angularly offset from a primary feeding and downstream direction, outboard of an adjacent driven conveyor having a top surface moving in the primary feeding and downstream direction. A further aspect provides a downstream moving conveyor belt or rollers which are vertically higher than the adjacent outboard skewed and converging driven rollers. A method of using an unstacking singulator for parcels is also disclosed.

The present singulator conveyor is advantageous over conventional systems. For example, the present conveyor directs parcels in an upwardly angled and converging manner to tip onto the adjacent conveyor while also deterring stacking of side-by-side parcels, such as packages and especially envelopes. The present singulator conveyor significantly improves singulating throughput efficiencies, thereby lessening the recirculation burden traditionally observed, while additionally deterring problems with downstream automated handling and electronic reading of bar code addresses on the parcels due to traditional stacking concerns which otherwise obscure the lower of the stacked parcels. Additional advantages and features of the present invention will be ascertained by the following description and appended claims, taken in conjunction with the accompanying drawings.

DETAILED DESCRIPTION

Figure 1:
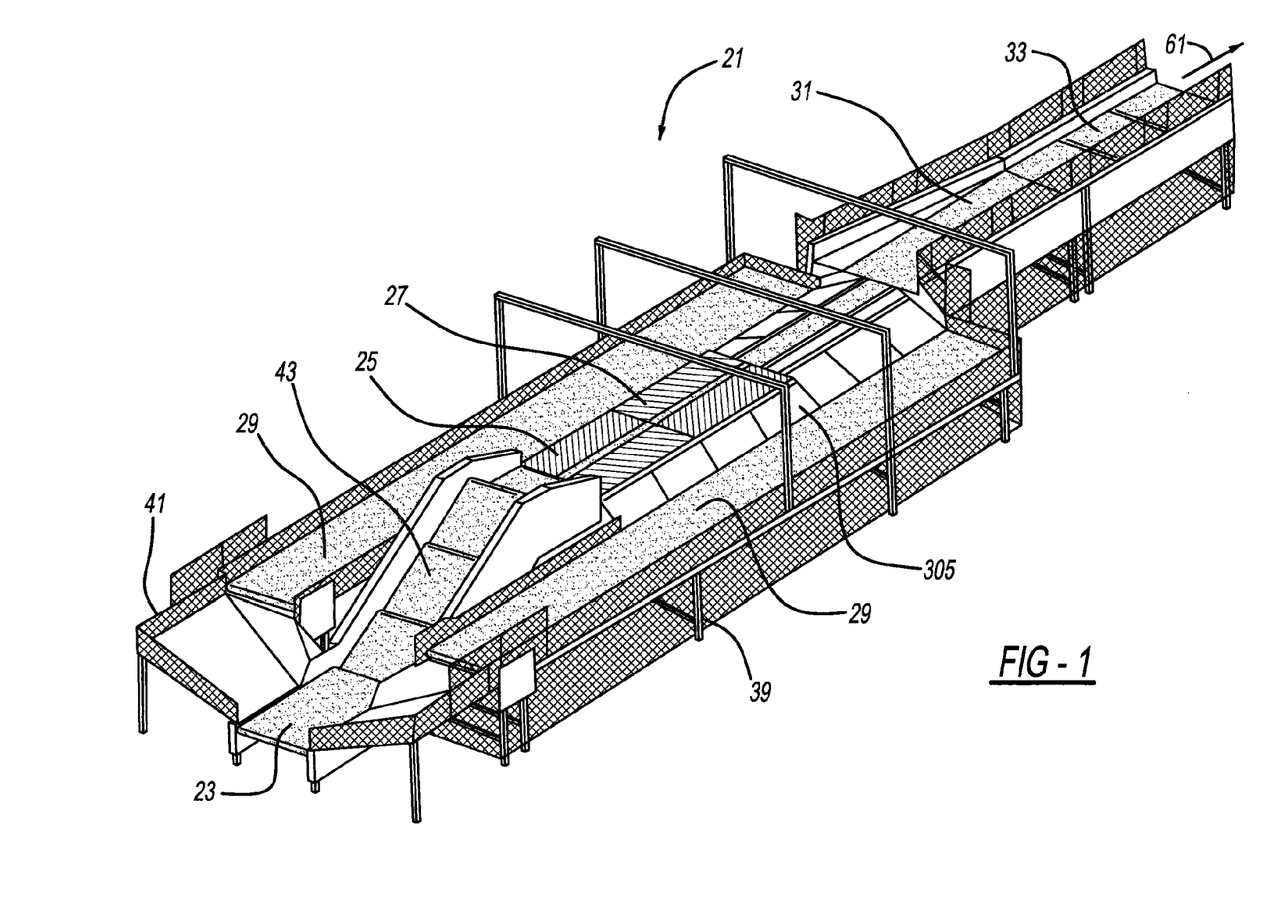
FIG. 1 is a perspective view showing a preferred embodiment of a conveyor machine of the present invention.
Figure 2:
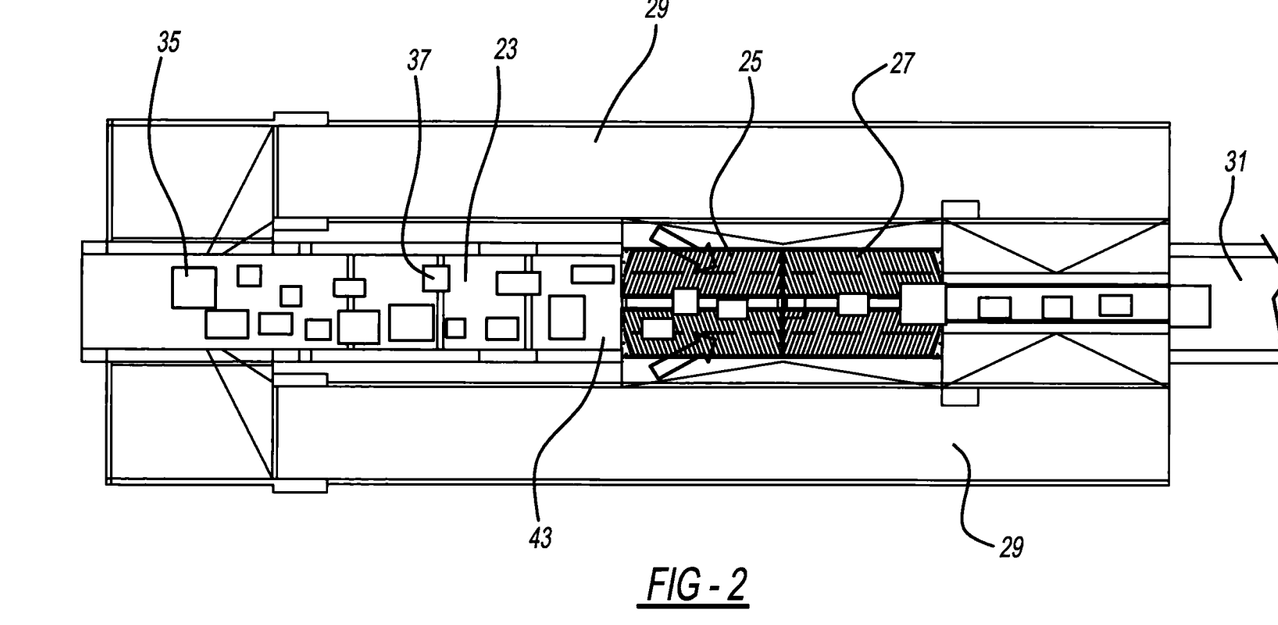
FIG. 2 is a top elevational view showing the preferred embodiment conveyor machine.
Figure 3:
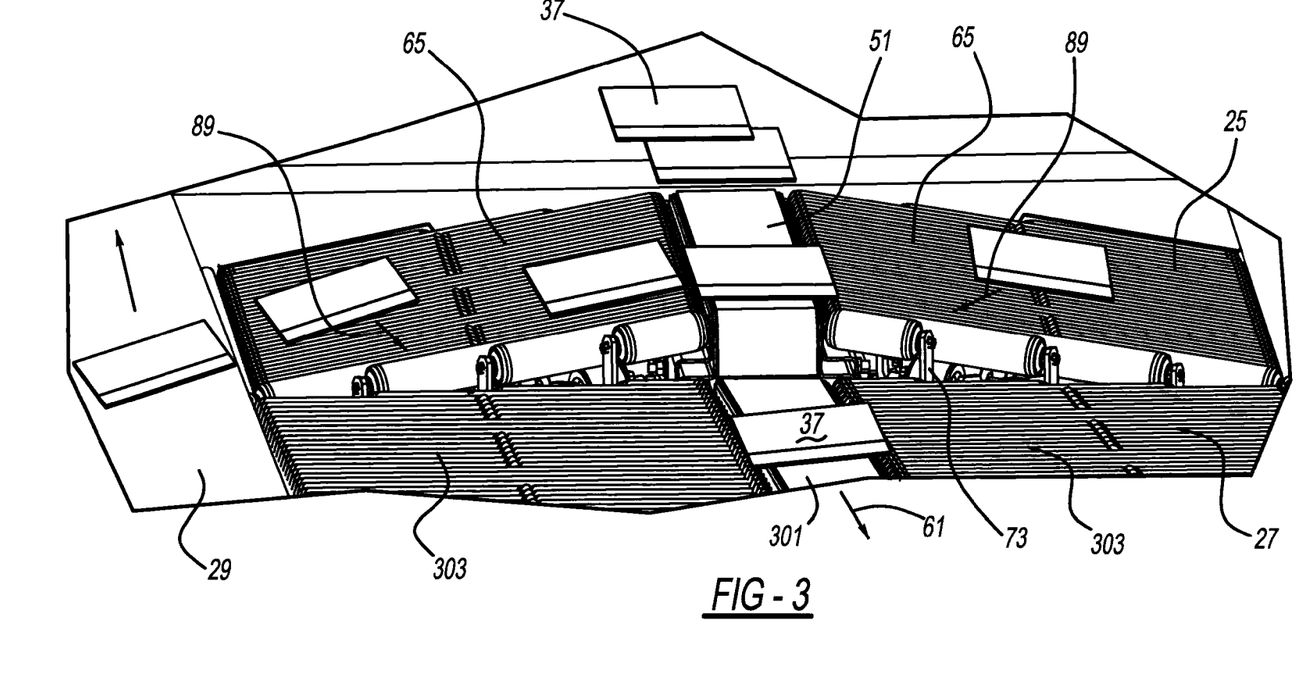
FIG. 3 is a fragmentary perspective view showing singulator and eliminator stations of the preferred embodiment conveyor machine.
Figure 4:
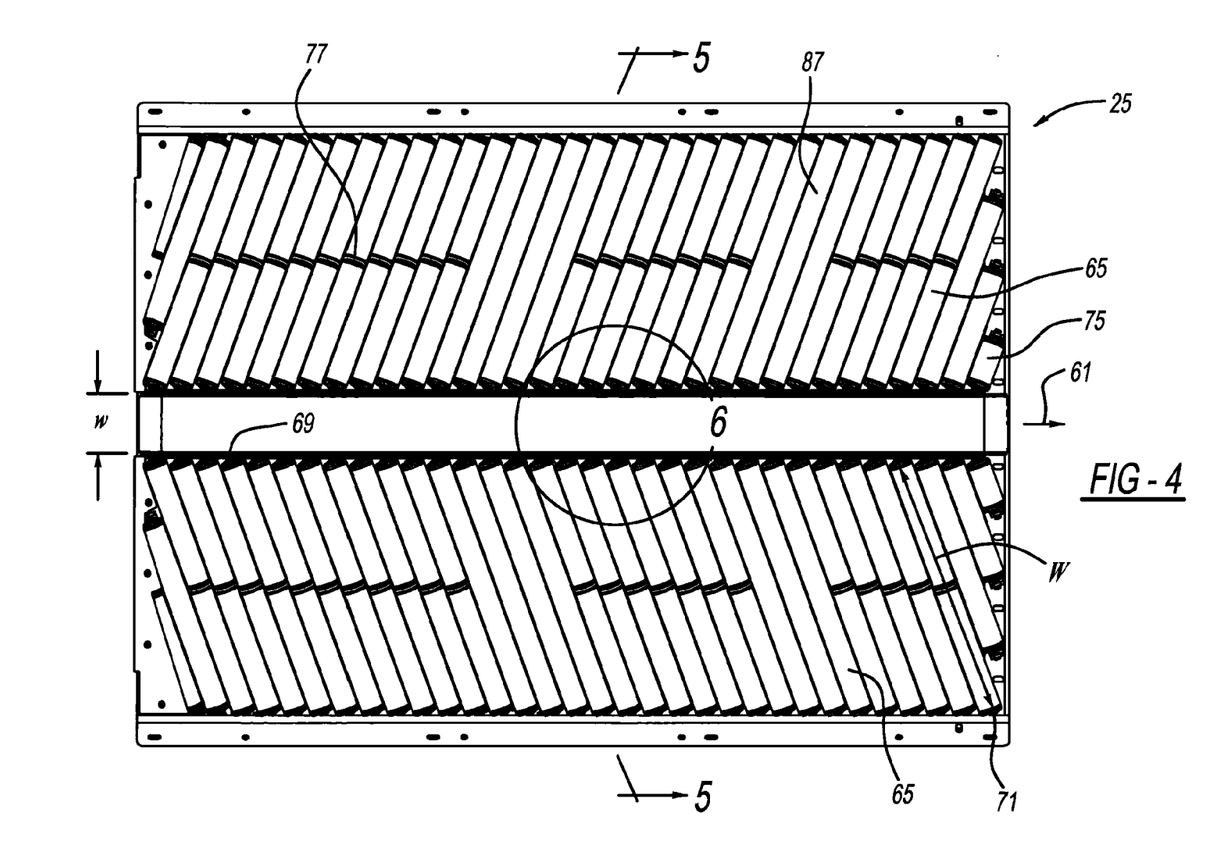
FIG. 4 is a top elevational view showing the preferred embodiment singulator.
Figures 5, 6:
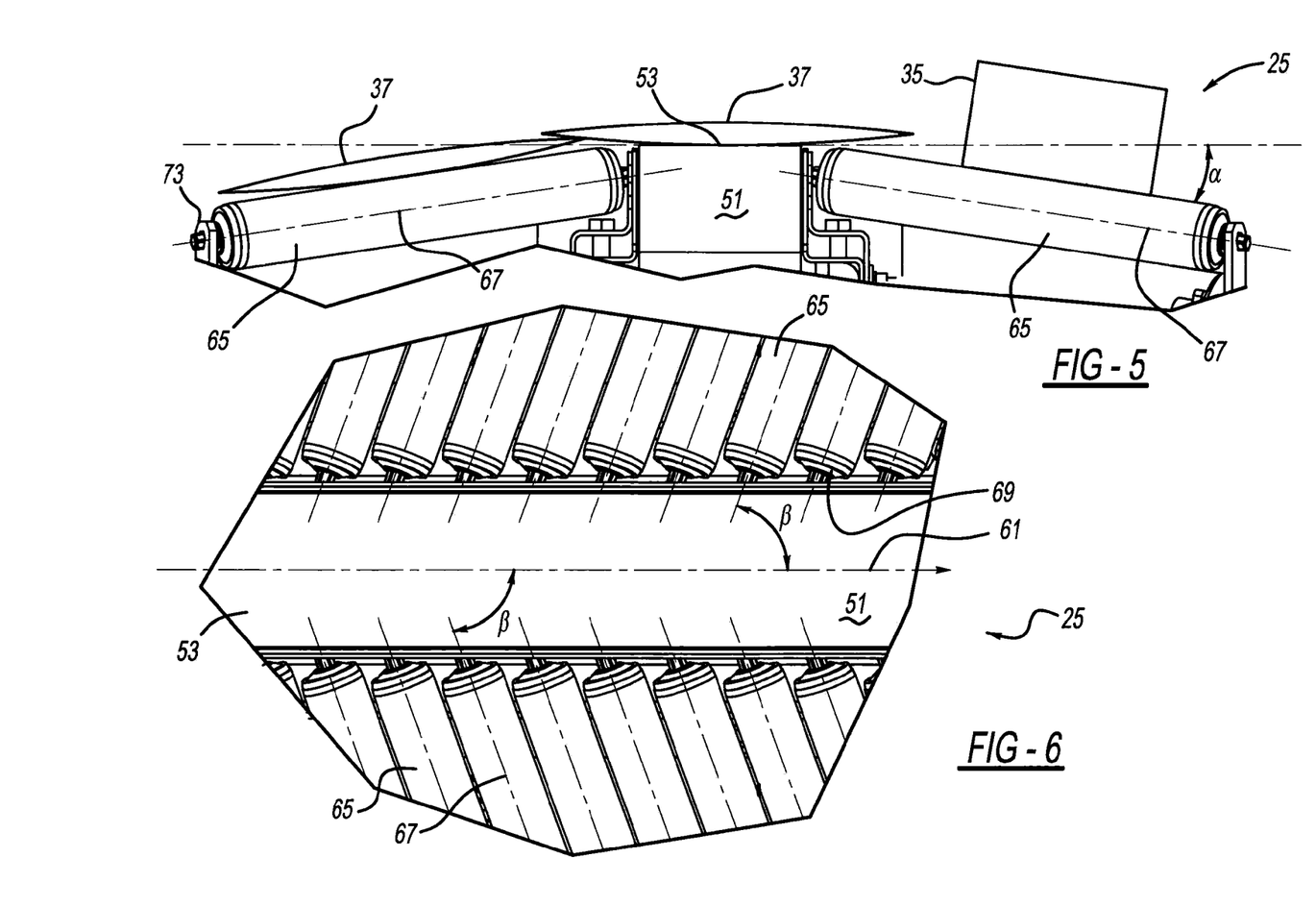
FIG. 5 is an end elevational view, taken along line 5-5 of FIG. 4, showing an exemplary roller and conveyor arrangement for the preferred embodiment singulator.
FIG. 6 is a fragmentary and enlarged top elevational view, taken within circle 6 of FIG. 4, showing the preferred embodiment singulator.
Figure 7:
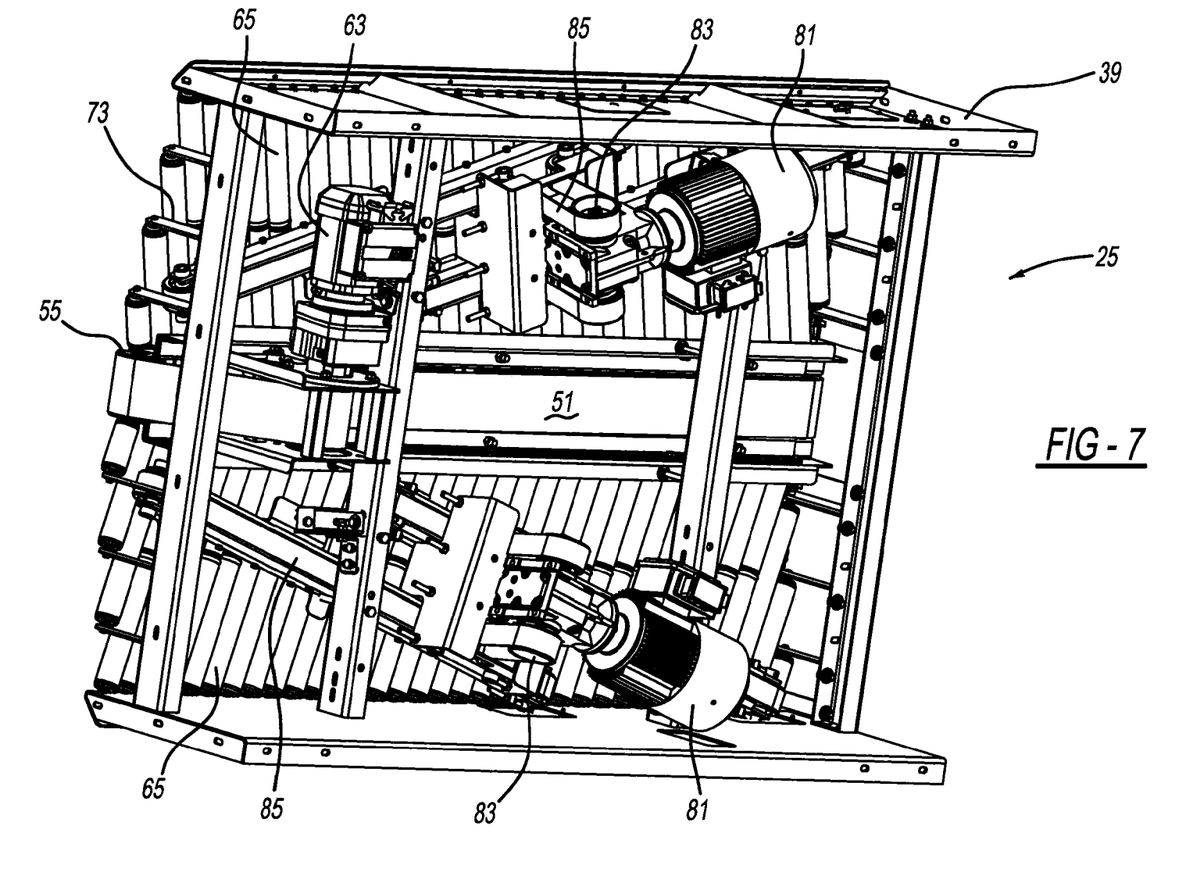
FIG. 7 is a bottom perspective view showing the preferred embodiment singulator.
Figure 8:
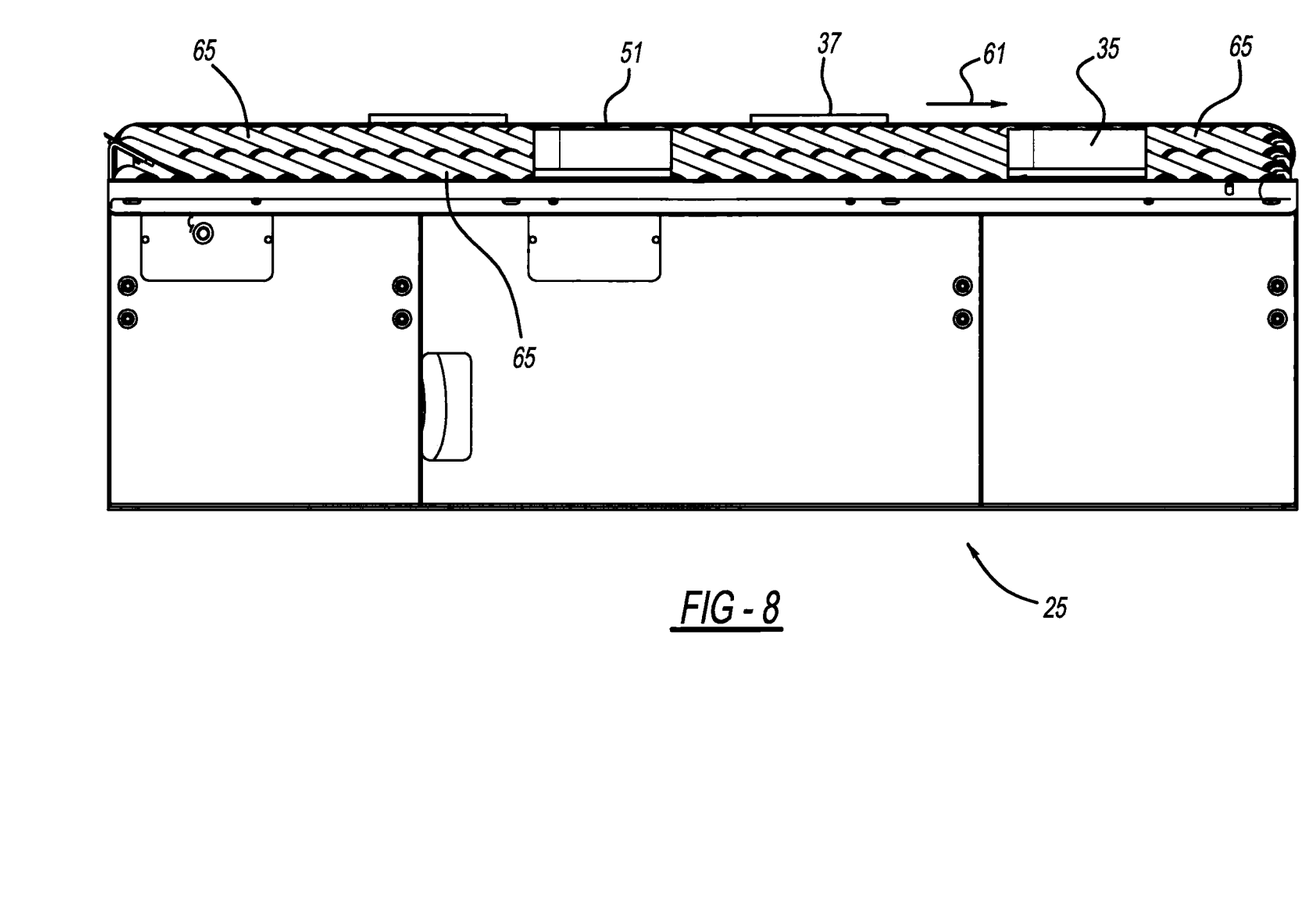
FIG. 8 is a side elevational view showing the preferred embodiment singulator.
Figure 9:
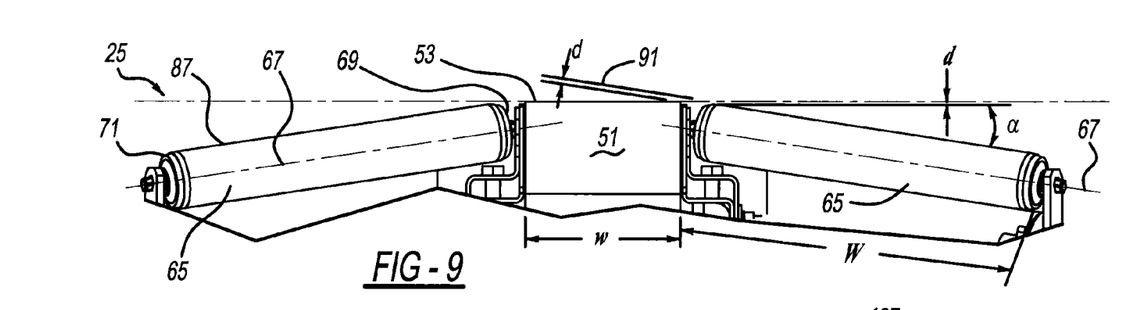
FIG. 9 is an end elevational view, like that of FIG. 5, showing the preferred embodiment singulator.

A preferred embodiment of a conveyor machine 21 is shown in FIGS. 1-3. Conveyor machine 21 includes a feeding conveyor station 23, a singulator conveyor station 25, an eliminator conveyor station 27, recirculating conveyor stations 29, an outlet conveyor station 31, an adjustable speed feedback metering conveyor station 33, and a sorting and automated address reading station. Multiple parcels, such as mailing boxes 35 and generally flat envelopes 37 capable of holding 8% by 11 inch letters, are placed onto feeding station 23 in a somewhat haphazard manner such as by dumping a container or bag of the parcels thereupon. Feeding conveyor station 23 further includes an inclined conveyor section 43 which raises and then drops the parcels onto singulator station 25. Furthermore, multiple legs 39 and protective fences 41 are provided along the sides of conveyor machine 21.

Reference should now be made to FIGS. 3-9 which illustrate greater details of singulator 25. Singulator 25 has a central conveying section 51, preferably a longitudinally elongated and continuous conveyor belt 51, with an upper surface 53 for frictionally contacting against an underside of parcels 35 and 37. Conveyor belt 51 is wrapped around at least fore and aft pulleys 55, which rotate about rotational axes which are horizontal and perpendicular to a primary and longitudinal feeding direction 61. Conveyor 51 carries and conveys the parcels located thereon in feeding direction 61. Conveyor belt 51 is driven by an electric motor 63 and driving pulley mounted to a bottom side of singulator 25.

A mirrored image pair of driven and converging sets of rollers 65 are located laterally outboard of central conveyor belt 51. Each of these rollers 65 is preferably circular-cylindrical, metallic and rotates about its central axis 67. Inboard ends 69 and outboard ends 71 of rollers 65 are journalled by stationary brackets 73 and bearings such that each roller 65 is generally laterally elongated between ends 69 and 71, with the exception of a few shortened leading or trailing rollers 75. Some of rollers 65 include an elastermeric O-ring 77 adjacent a middle thereof. An electric motor 81, output pulleys 83 and continuous belts 85 frictionally drive bottoms of each set of rollers 65 such that upper surfaces 87 of rollers 65 rotate in a generally downstream and converging direction 89 essentially toward conveyor belt 51.

As can best be observed in FIGS. 4-6, 8 and 9, upper surface 87 and rotational axis 67 of each singulator roller 65 are three-dimensionally skewed and obliquely angled with its outboard end 71 oriented downstream (when viewed from the top as in FIGS. 4 and 6) and lower (as viewed from the side and end as in FIGS. 8 and 9) relative to inboard end 69. Thus, each singulator roller 65 is upwardly angled toward centerline feeding direction 61 by 8-20° off of horizontal, and more preferably 8-10°, at angle α; the steeper angles may be employed if high friction rollers are used. Furthermore, top view skew angle β of each upper roller surface 87 and axis 67 are 15-40° and more preferably about 20° relative to primary feeding direction 61. The specific three-dimensionally skewed angles advantageously cause convergence of parcels from driven rollers 65 onto central conveyor belt 51 while also deterring parcel stacking.

It is noteworthy that upper surface 53 of conveyor belt 51 is vertically located 1-2 mm higher at d above the highest point of rollers 65. Nevertheless, a projection line 91 from upper surface 87 of each roller 65 also projects a distance d of about 1-2 mm above the adjacent corner of conveyor belt 51. The raised nature of conveyor belt 51 and the three-dimensionally skewed orientation of singulator roller 65 deter stacking of the parcels, especially laterally adjacent envelopes 37, since the abutting parcel edges act as thicker packages abutting into each other through an edge contacting a bottom, rather than a traditional coplanar arrangement which causes the parcels to slip above or below each other. Moreover, the present construction causes the parcels to inwardly and upwardly move until a tipping point is reached with regard to the parcel's center of gravity. Thereafter, the center of gravity of each parcel 35 and 37 is controlled by central conveyor belt 51 and is no longer driven by roller 65. It is also noteworthy that the lateral width w of conveyor belt 51 is at least 100 mm, and more preferably at least half the typical parcel width, yet less than a lateral direction of elongation W of each adjacent nominal roller 65 (as differentiated from the few shortened leading or trailing rollers 75).

Figures 10, 11:
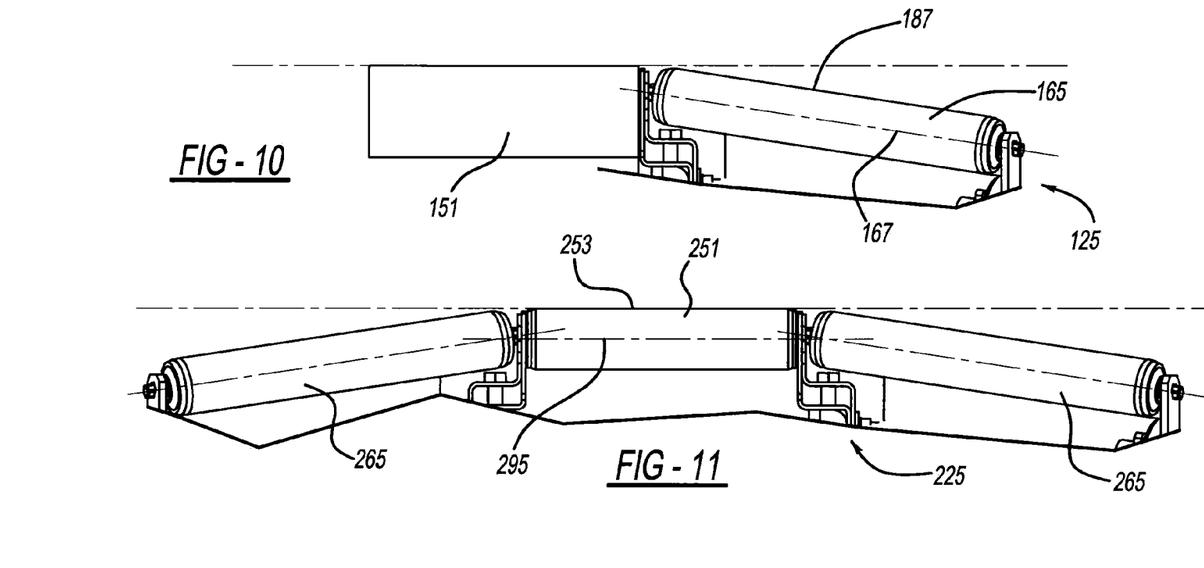
FIG. 10 is an end elevational view, like that of FIG. 5, showing an alternate embodiment singulator.
FIG. 11 is an end elevational view, like that of FIG. 5, showing another alternate embodiment singulator.

Reference should be made to an alternate embodiment singulator 125 of FIG. 10. In this variation, a single upward set of driven and converging rollers 165 is employed adjacent a single driven and higher conveyor belt 151. This conveyor belt 151 is laterally wider than the prior version. Moreover, an upper parcel contacting surface 187 and rotational axis 167 of each driven roller are three-dimensionally skewed relative to a centerline and primary feeding direction as with the prior embodiment.

FIG. 11 illustrates yet another variation of singulator 225. In this construction, a pair of laterally outboard and three-dimensionally skewed driven rollers 265 are provided like that of the first embodiment. However, a central conveyor employs a set of driven rollers 251 each having a rotational axis 295 oriented perpendicular to the primary downstream feeding direction. Parcel-contacting upper surfaces 253 of central conveying rollers 251 are raised above the outboard converging singulator rollers 265. Rollers 265 and 251 are each circular-cylindrical and laterally elongated by at least 25 mm and more preferably at least 100 mm.

Eliminator station 27 includes a central conveyor belt 301, or alternately driven rollers, which are centered between outboard sets of diverging angled rollers 303. Outboard diverging rollers 303 are driven by electric motor and underlying frictional belt mechanisms. Outboard rollers 303 are horizontally coplanar with each other, although they can be three-dimensionally skewed. In other words, the rotational axis and upper surface of each diverging roller of eliminator 27 are obliquely angled relative to downstream feeding direction 61 in only a top view but not otherwise skewed or angled in an end or side view. Additionally, a set of chutes 305 or walls are stationarily angled to direct side-by-side packages remaining on rollers 303 away from conveyor belt 301 and onto recirculation belts 29. An exemplary eliminator station is disclosed in U.S. Pat. No. 5,701,989 entitled "Conveyor for Removing an Article Conveyed Abreast of Another Article" which issued to Boone et al. on Dec. 30, 1997, and is incorporated by reference herein.

Figure 12:
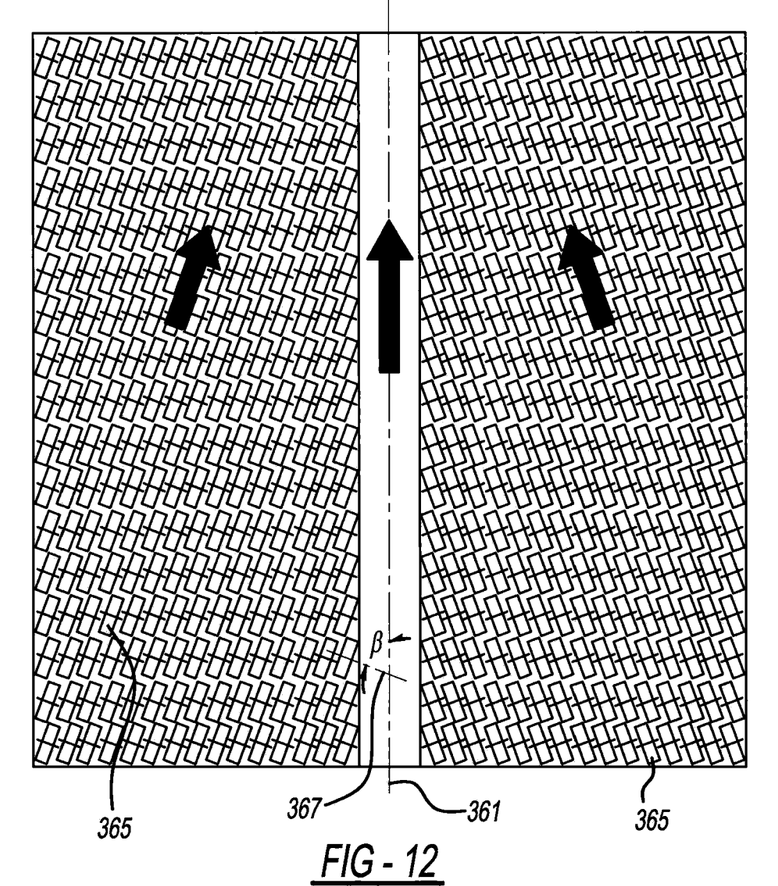
FIG. 12 is a top elevational view showing another alternate embodiment singulator.
Figure 13:
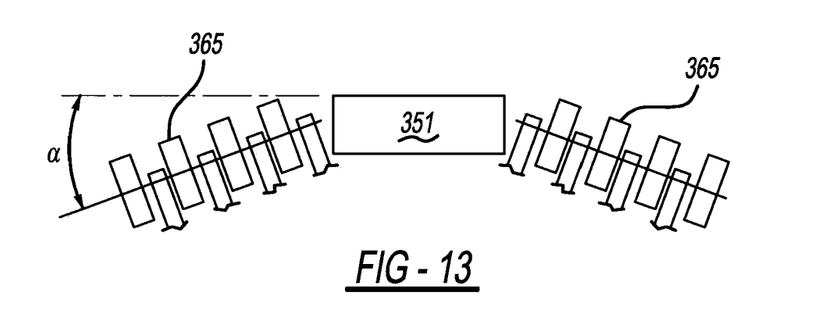
FIG. 13 is an end elevational view, like that of FIG. 5, showing the alternate embodiment singulator of FIG. 13.

Another alternate embodiment singulator 325 is shown in FIGS. 12 and 13. This variation includes laterally individualized and converging sets of roller wheels 365 on either outboard side of a central conveyor belt 351. Roller wheels 365 are driven by electric motors and conveyor belt 351 is also driven by an electric motor. Each roller wheel 365 is three-dimensionally skewed with their axes obliquely offset angle β relative to central feeding direction 361 in a top view, and offset angle α downwardly toward their outboard grouped ends relative to a horizontal plane set by a parcel-contacting upper surface of belt 351. The coaxial axes of each lateral group of roller wheels 365 are stationarily set by their upstanding brackets.

While various embodiments have been disclosed, it should be appreciated that other variations may be made. For example, a tapered driven roller may be employed although many of the present advantages will not be realized. Furthermore, at least 15, and more preferably at least 30, driven singulator rollers can be used on each side of a central conveyor belt, however, a greater or smaller quantity may be employed although certain advantages may not be achieved. The roller and belt-driving actuators and transmissions may alternately be varied to use pneumatic motors, sprocket and chain transmissions, cables, gears and drive shafts, and many other mechanisms, although certain advantages may not be realized. Individual elements or features of a particular embodiment are generally not limited to that particular embodiment, but, where applicable, are interchangeable and can be used in a selected embodiment, even if not specifically shown or described. It is intended by the following claims to cover these and any other departures from the disclosed embodiments which fall within the true spirit of this invention.

The invention claimed is:

1. A conveyor machine comprising a singulator which further comprises:
   a first driven conveyor section including at least one upper surface moving in a primary feeding direction; and
   at least a second section located laterally outboard of the first conveyor section, the second section including multiple driven rollers at least a majority of which being each elongated between journalled ends thereof, and the direction of elongation of upper surfaces of the second section rollers being downwardly tilted toward an outboard end thereof and also offset tilted relative to the primary feeding direction.

2. The conveyor machine of claim 1, further comprising:
   a feeding conveyor upstream of the singulator, a lateral width of the feeding conveyor being greater than twice as wide as the first conveyor section of the singulator; and
   an eliminator downstream of the singulator, the eliminator further comprising a third driven conveyor section including an upper surface substantially aligned with the first conveyor section of the singulator, and at least a fourth section including multiple rollers with their rotational axes being substantially horizontal and causing a diverging action.

3. The conveyor machine of claim 2, further comprising:
a driven recirculation conveyor located outboard of the singulator and eliminator, and the recirculation conveyor including an upper surface moving in an opposite direction of the upper surfaces of the first and third conveyor sections; and
an outlet conveyor downstream of and substantially aligned with the third conveyor section of the eliminator.

4. The conveyor machine of claim 2, wherein the first and third conveyor sections each include a rotating conveyor belt driven by an electric motor, the rollers of the second and fourth sections are driven by additional electric motors, and at least a majority of the rollers of the fourth section of the eliminator are two-dimensionally skewed relative to the primary feeding direction and in an opposite mirrored configuration to those of the rollers of the second section of the singulator as viewed from above.

5. The conveyor machine of claim 1, further comprising another section of multiple driven rollers of the singulator which are three-dimensionally skewed in substantially mirrored image of the second section, and the first conveyor section of the singulator being laterally located between the singulator sections of multiple rollers, and each of the singulator rollers being circular cylindrical.

6. The conveyor machine of claim 1, wherein the first driven conveyor section includes a rotating conveyor belt having a lateral width less than an elongated length of a majority of the adjacent singulator rollers.

7. The conveyor machine of claim 1, wherein the first driven conveyor section includes a rotating additional set of laterally elongated rollers having rotational axes substantially perpendicular to the primary feeding direction and having an elongated roller length less than that of a majority of the adjacent singulator rollers.

8. The conveyor machine of claim 1, wherein the upper surface of the first driven conveyor section is vertically higher than all of the singulator rollers.

9. The conveyor machine of claim 1, further comprising parcels moved by the singulator, the fore-and-aft tilted and downwardly tilted orientation of the singulator rollers deterring undesired stacking of the parcels on top of each other on the adjacent first conveyor section.

10. The conveyor machine of claim 1, wherein at least a majority of the driven rollers of the second section are spaced apart wheels, a lateral group of the wheels are co-axially tilted in both a fore-and-aft direction and in a downward direction, and all of the wheels have a converging rotational direction substantially toward the first driven conveyor section.

11. A conveyor machine comprising:
a first driven singulator conveyor section having an upper surface;
at least a second driven singulator conveyor section located laterally outboard of and adjacent to the first section, the second section including rollers each having a rotational axis;
the upper surface of the first section being raised above all portions of each roller of the second section; and
the rotational axes of the second section rollers being obliquely angled relative to the first section, with outboard ends of the second section rollers being lower than inboard ends of the second section rollers which are closest to the first section.

12. The conveyor machine of claim 11, further comprising:
a feeding conveyor upstream of the singulator sections, the feeding conveyor being greater than twice as wide as the first singulator conveyor section; and
an eliminator conveyor downstream of the singulator sections, the eliminator conveyor further comprising a third driven eliminator conveyor section substantially aligned with the first singulator conveyor section, and at least a fourth eliminator section including multiple rollers with their rotational axes being substantially horizontal.

13. The conveyor machine of claim 11, wherein the axes of the second singulator section rollers are obliquely angled in a top view, with the outboard ends being closer toward a downstream end of the singulator than are the inboard ends.

14. The conveyor machine of claim 11, further comprising another section of multiple driven singulator rollers three-dimensionally skewed in substantially mirrored image to the second singulator section, and the first singulator conveyor section being located laterally between the singulator sections of multiple rollers.

15. The conveyor machine of claim 11, wherein the first driven singulator conveyor section includes a rotating conveyor belt having a lateral width less than an elongated length of a majority of the adjacent singulator rollers.

16. The conveyor machine of claim 11, further comprising parcels moved by the singulator sections, the obliquely angled end view orientation of the singulator rollers deterring undesired stacking of parcels on top of each other on the adjacent first conveyor section.

17. The conveyor machine of claim 11, wherein the first driven singulator conveyor section includes another set of driven rollers having horizontal rotational axes.

18. A conveyor machine comprising:
(a) parcels;
(b) a feeding conveyor including an inclined driven belt;
(c) a singulating conveyor comprising:
(i) a central belt having an upper surface moving in a primary direction away from the feeding conveyor;
(ii) a first set of driven and converging rollers each having an upper surface angularly offset along at least two planes relative to the primary direction;
(iii) a second set of driven and converging rollers each having an upper surface angularly offset along at least two planes relative to the primary direction, the upper surface of the central belt being vertically higher than the converging sets of rollers, and the central belt being located between the converging sets of rollers;
(d) an eliminating conveyor located downstream of the singulating conveyor, the eliminating conveyor comprising:
(i) a central belt having an upper surface moving away from the singulating conveyor;
(ii) a first set of diverging rollers each having an upper surface angularly offset along at least one plane relative to the primary direction;
(iii) a second set of diverging rollers each having an upper surface angularly offset along at least one plane relative to the primary direction, the central belt of the eliminating conveyor being located between the diverging sets of rollers;
(iv) angled chutes positioned outboard of the diverging sets of rollers; and
(e) recirculation conveyors located outboard of the eliminating conveyor and moving in a direction substantially opposite the primary direction;
the parcels being fed in a substantially haphazard arrangement from the feeding conveyor to the singulating conveyor, the singulating conveyor converging and deterring stacking of the parcels, and the eliminating conveyor causing any of the parcels arranged side-by-side to be recirculated back to the feeding conveyor via the recirculation conveyors.

19. The conveyor machine of claim 18, wherein the singulating conveyor belt has a lateral width of at least 25 mm but less than half of an elongated length of each of the singulating conveyor rollers adjacent a longitudinal middle of the singulator.

20. The conveyor machine of claim 18, further comprising a motor driving each of the roller sections and each of the belts mechanically independently of each other.

21. The conveyor machine of claim 18, wherein at least some of the parcels are envelopes.

22. The conveyor machine of claim 18, wherein the upper surfaces of the rollers of the singulating conveyor are all vertically lower than the singulating conveyor belt.

23. The conveyor machine of claim 18, wherein all of the rollers of the singulating and eliminating conveyors are circular-cylindrical.

24. The conveyor machine of claim 18, wherein each of the driven rollers includes a group of co-axial and spaced apart wheels.

25. A conveyor machine comprising:
a driven conveyor having an upper surface moving in a feeding direction;
a left set of driven rollers each including an upper surface angularly offset along at least two planes relative to the feeding direction;
a right set of driven rollers each including an upper surface angularly offset along at least two planes relative to the feeding direction, the conveyor being located between the sets of rollers; and
parcels converging toward the conveyor when on the rollers and being deterred from stacking, and the parcels falling over on top of the conveyor and substantially losing driving contact of the rollers when the parcels have passed a converging tipping point.

26. The conveyor machine of claim 25, wherein the conveyor is an elongated belt.

27. The conveyor machine of claim 25, wherein the conveyor is a central set of driven rollers each having a lateral elongated dimension of at least 100 mm.

28. The conveyor machine of claim 25, wherein at least some of the parcels are envelopes.

29. The conveyor machine of claim 25, wherein the driven conveyor is vertically higher than all of the rollers.

30. The conveyor machine of claim 25, wherein all of the rollers are circular-cylindrical and at least a majority are elongated along their rotational axes.

31. A method of conveying parcels, the method comprising:
(a) moving parcels in a substantially downstream and inwardly converging direction on driven rollers which have parcel-contacting surfaces which are obliquely angled both downwardly and downstream toward their outboard ends relative to a downstream direction;
(b) tipping the parcels from inboard ends of the rollers onto at least one parcel-contacting surface of a driven conveyor, adjacent to inboard ends of the rollers while moving in the downstream direction; and
(c) the rollers and conveyor assisting in creating a single file line of the parcels while deterring stacking of the parcels upon each other.

32. The method of claim 31, wherein the parcel-contacting surface of the conveyor is vertically higher than all of the downwardly and downstream angled rollers.

33. The method of claim 31, where in the conveyor is an elongated belt which has a lateral width less than half an elongated length of each of at least a majority of the adjacent obliquely angled rollers.

34. The method of claim 31, wherein the conveyor includes multiple driven rollers which rotate about axes perpendicular to the downstream direction.

35. The method of claim 31, further comprising moving additional parcels toward the conveyor on a second set of three-dimensionally obliquely angled and driven rollers, the conveyor being located between the mirrored image sets of the rollers.

36. The method of claim 31, wherein the conveyor rotates about at least one axis always perpendicular to the downstream direction.

37. The method of claim 31, wherein at least some of the parcels are envelopes.

38. The method of claim 31, further comprising driving a group of the rollers with a first electric motor and driving the conveyor with a second electric motor.

39. The method of claim 31, wherein at least a majority of the driven rollers are elongated and there are at least twenty of the driven rollers on an outboard lateral side of the conveyor.

\* \* \* \* \*